(12) United States Patent
Schmitt

(10) Patent No.: US 8,253,411 B2
(45) Date of Patent: Aug. 28, 2012

(54) ARRANGEMENT OF A COIL PAIR IN A LOCAL MEASUREMENT AREA

(75) Inventor: Andreas Schmitt, Pottenstein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 482 days.

(21) Appl. No.: 12/668,064

(22) PCT Filed: Jul. 17, 2008

(86) PCT No.: PCT/EP2008/059366
§ 371 (c)(1),
(2), (4) Date: Jan. 8, 2010

(87) PCT Pub. No.: WO2009/010552
PCT Pub. Date: Jan. 22, 2009

(65) Prior Publication Data
US 2011/0128110 A1 Jun. 2, 2011

(30) Foreign Application Priority Data
Jul. 19, 2007 (DE) .......................... 10 2007 033 751

(51) Int. Cl.
*G01B 7/14* (2006.01)
(52) U.S. Cl. ............... 324/207.15; 324/207.13; 324/200
(58) Field of Classification Search .................. None
See application file for complete search history.

(56) References Cited

U.S. PATENT DOCUMENTS

| 6,714,004 | B2 | 3/2004 | Jagiella |
| 6,948,383 | B2 * | 9/2005 | Wilczek .................... 73/862.332 |
| 7,868,809 | B2 * | 1/2011 | Iadanza et al. ................. 341/154 |
| 2002/0089326 | A1 | 7/2002 | Morrison et al. |
| 2002/0186007 | A1 | 12/2002 | Cao et al. |

FOREIGN PATENT DOCUMENTS

| DE | 201 20 658 U1 | 6/2002 |
| EP | 1 158 266 A1 | 11/2001 |
| EP | 1 508 781 A2 | 2/2005 |
| EP | 1 887 322 A1 | 2/2008 |
| WO | 97/39312 A1 | 10/1997 |

* cited by examiner

Primary Examiner — Jermele M Hollington
Assistant Examiner — Trung Nguyen
(74) Attorney, Agent, or Firm — Davis & Bujold, P.L.L.C.

(57) ABSTRACT

A configuration of a pair of inductor coils within a local measuring range which can comprise a position range or an angle range. For the coil configuration, a nominal distance to a damping part is predefined which comprises an eddy current damping part which covers the coils, to a certain degree. In the evaluation circuit, the coils are connected to a capacitor, forming an oscillator part, whose inductance and capacitance determine a resonant frequency. The characteristic curve, oscillator frequency as a function of the position or the angle is linear. The rectangular inductors of the pair of coils overlap within the measuring range. The linear characteristic curves have a common point of rotation, outside of the measuring range, which is independent from interferences by the measuring configuration.

14 Claims, 7 Drawing Sheets

ARRANGEMENT OF A COIL PAIR IN A LOCAL MEASUREMENT AREA

This application is a National Stage completion of PCT/EP2008/059366 filed Jul. 17, 2008, which claims priority from German patent application serial no. 10 2007 033 751.7 filed Jul. 19, 2007.

FIELD OF THE INVENTION

The invention concerns a layout of two inductors (of an inductor pair) in a local measuring range. A local measuring range can be defined as position range if a linear position s is measured, or it can be defined as an angle range if an angle α is measured. It is also important, in an inductor coil configuration, to predefine a nominal distance x of a damping part. The damping part is configured as an eddy current damping part which—depending on the position s and the angle α to be measured—covers the inductor coils to a certain degree. The inductance will depend on the covered inductor coil area.

BACKGROUND OF THE INVENTION

In an evaluation circuit, the inductor coils are often combined with a capacitor to create an oscillator part where the inductance and the capacitance determine a resonant frequency f. In the case of a position change of the damping part, the coverage of the flat inductor coils changes as well. Due to the eddy current effect, the inductance of the coil changes and, therefore, the resonant frequency f changes. In the end, the evaluation circuit possesses a characteristic curve f(s), in this example the oscillator frequency f is a function of the position s.

It is known in the art to design the flat coils as rectangular coils, hereby obtaining a relatively wide and linear measuring range M. Also known in this context, from an older publication EP 06015898 published as EP 1 887 322 A1 and the appreciated state of the art, is that a trapezoid extension of the rectangular coil end increases the linear and useable measuring range M so that it matches the coil length L. These conditions are the basis of the invention, meaning that the invention is based on this inductive sensor technique, differing from resistive, capacitive, or magneto-resistive and other measuring principles.

However, these rectangular coils have almost exclusively been used in a way that they were configured, one after another, in one single measuring direction. Two triangular interleaved and overlapping flat coils, which are also known in the art, cannot be compared with this invention because they do not possess linear characteristics.

Deviating hereof, as known from FIG. 7 of WO 97/39312 A1 and FIGS. 2 and 13 from US 2002/0186007 A1, coil pairs are known in the art which overlap each other within the measuring range. However, these configurations measure just the inductance, instead of the oscillator frequency, or (if the oscillator frequency is measured as in WO 97/39312 A1), no attention is paid to a linear characteristic.

It is also known that, during the measuring sequence, the generically decisive coil configuration can be exposed to interferences. Changes in the distance of the measuring level of the flat coils and the damping part cause sensitive reactions of the linear characteristics. Also a tilting of the measuring configuration, meaning that different distances between one coil and another coil, can cause measurement errors. Finally, the measuring result is dependent on the temperature. Therefore, the task of this invention is to create a coil configuration, not receptive to interferences.

SUMMARY OF THE INVENTION

The task is accomplished through a coil configuration comprising an arrangement where the coils:
a) overlap as rectangular coils within the measuring range,
b) have an overhang in the coil length at each end of the measuring range,
c) and each have, as part of the measuring oscillator, a linear characteristic curve, as function of location (position, angle), and that
d) these linear characteristic curves each have, mostly independent from interferences, a virtual center of rotation, meaning outside of the measuring range, in the field of the characteristic curves (array of characteristic curves).

The invention can advantageously be applied especially under difficult measuring conditions. In certain measuring applications, for instance in transmissions, the length and the track of the motion of the damping part are not accurately defined and the relative location, in regard to the transmission, is only determined at the time of the installation of the inductive sensor configuration. In this case, the distance x as well as the tilting β of the damping part can vary. Also, the operating temperature of the transmission may vary.

Under these circumstances, it is the first advantage of the invention that the length of the damping part does not need to be matched to the length of the inductor coil. In accordance with the invention, the inductor coil configuration is generally operated in a way so that an edge of the damping part does not function. In fact, the damping part area is defined exactly by just one edge, in the measuring area and the eddy current area to follow.

The second advantage of the invention is based on the fact that the overlapping area of the coil pair defines the measuring area M and, therefore, the inductor coil overlap is measured very accurately. Decisive in this invention is an overhang, outside of the measuring area, whereby it is already sufficient to have approx. 15% of the coil length L outside of the measuring area M and its exact linearity.

The third and decisive advantage of the invention is that, in such a defined coil configuration, all relevant interferences will follow the law of a virtual point of rotation. Outside of the measuring range, there is a point in the array of characteristic curves which is largely independent of the distance x, the tilting β, and/or the temperature T. For that reason and for the purpose of an accurate measurement, is does not need to be known, which actual interference is an influencing factor. If changes in distance as well as the temperature changes comply, it is preferred to calibrate the measuring configuration to this virtual point of rotation and to perform the temperature compensation, if necessary, by means of an auxiliary reference coil.

BRIEF DESCRIPTION OF THE DRAWINGS

Embodiments of the invention are presented in FIGS. 1 to 8. It is shown in

DETAILED DESCRIPTION OF THE PREFERRED EMBODIMENTS

Figure 1:
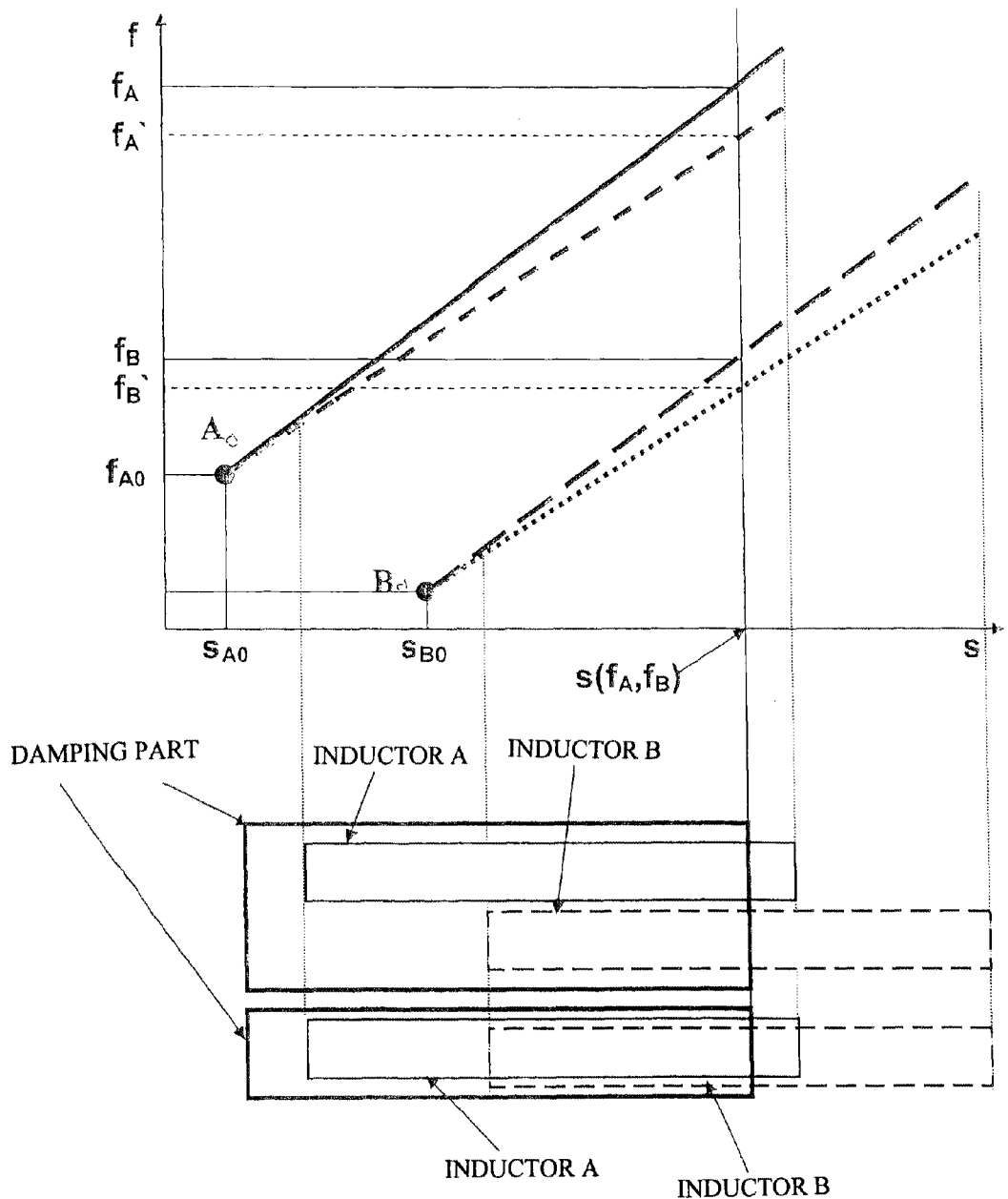
FIG. 1 is a top view of two inductor coils A and B which overlap in the measuring range, and a top view of a damping part (whereby the inductor coil A and B are positioned either next to each other, and the damping part has the proper width, or, the coils A and B are positioned below each other and the damping part has the proper slenderness), as well as a diagram of the related characteristic curves, each for a nominal distance x of the coil pair A, B, and for an interfered distance $x_1$ of the damping part of the coils A, B.

On the bottom, FIG. 1 shows two equivalent configurations of linear flat coils A, B.

In these two embodiments, the coils A, B are designed as rectangular flat coils. It is essential in this invention that the coils A, B overlap in the direction of the measurement. Thus, the direction of measurement is defined by moving also the rectangular damping part in the direction of the position axis s, relative to the pair of coils A, B.

The length of the coils A, B is usually the same and the coils overlap by 85% of their length L, for example. This overlapping range of 0.85 L is defined as the measuring range M. The remaining length of the coil, of 15% of the length L for instance, forms an overhang which is also essential in the function of the pair of coils A, B.

As presented in FIG. 1 and enlarged in FIG. 2, the overlapping can be achieved by positioning the coils A, B either next to each other, having a relatively wide damping part covering both coil tracks, or by having a pair of coils positioned below each other, on the top and bottom part of the coil carrier, and by having a respective smaller damping part.

Both variations of overlapping will end up with the array of characteristic curves as shown in FIG. 1. Shown here, as function of the position s of the damping part, is the resonant frequency f of both coils A, B of an oscillator, each particular coil is a part of it. One can see from FIG. 1 that, for the mentioned rectangular shaped coil configurations, the correlation between the resonant frequency $f_A(s)$ and $f_B(s)$ and the damping part position s is linear in each case. Because coil B is offset by 15% of the coil length L, for example, toward the measuring direction in relation to coil A, the correlating dashed characteristic curve belonging to B and in correlation to the characteristic solid curve, related to A, is also offset to the right side. The resonant frequencies $f_A$, belonging to A and located in the measuring area M, are accordingly higher than the resonant frequencies $f_B$ belonging to B because the inductor coil A covers more than the inductor coil B.

The invention realizes that the characteristic curves $f_A(s)$ and $f_B(s)$ have special features. Not only are they exactly linear in the measuring range M, but the characteristic curve array also possesses a special form of interference. This fact, especially in the dependency to the distance, is explained by FIG. 1. It is known that the characteristic curve f(s) reacts sensitively to changes of the distance x between the inductor coil and the damping part. Yet, it has not been recognized that the characteristic curve array possesses a virtual point of rotation, outside of the measuring range M. The previously described characteristic curves $f_A(s)$ and $f_B(s)$ apply to a nominal distance $X_0$, between the damping part and the coils A, B. If the distance between $X_0$ and $S_1$ changes, due to an interference of the measuring procedure, as presented in FIG. 1, the characteristic curves change to $f_A'(s)$ and $f_B'(s)$. Therefore, the characteristic curve array of coil A possesses a point of rotation $A_0$, having the coordinates $S_{A0}$ and $f_{A0}$, which remain the same, independent of the change in distance. The same applies for the point of rotation B0 of the coil B characteristic curve array.

Figure 3:
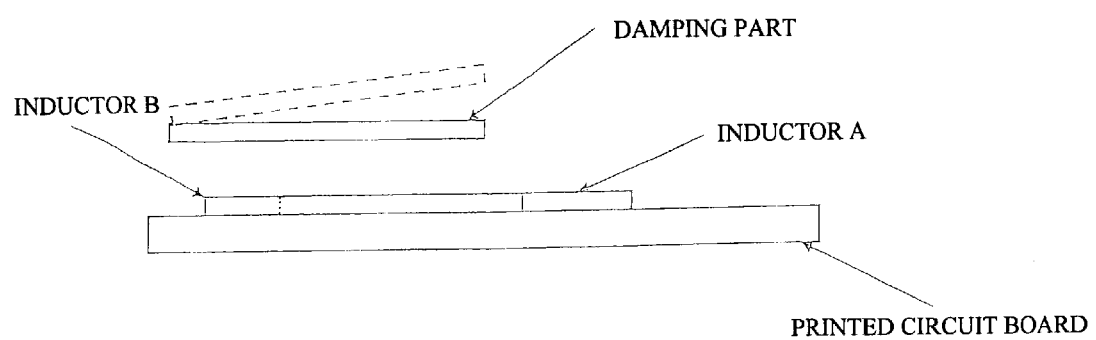
FIG. 3 is an example of the tilting β of the damping part in FIG. 1 and FIG. 2, in the direction of measurement.

The characteristic of the two curve arrays, which are just offset, allows a very favorable signal analysis which makes the measuring result s in the measuring range M independent from any interference in regard to the distance x. The characteristic of the virtual point of rotation applies, in accordance with this innovation, not just to the dependence on distance, but also interferences which have been caused by a tilting β of the damping part in the direction of measurement. Such a tilting β is schematically shown in FIG. 3. Measurement errors, which have been caused by either moving a damping part in the measuring direction as well as by an uplift of the tilted damping part in the measuring direction, can be extracted.

Beside interferences caused by distance variations and tilting variations, the resonant frequencies f are also temperature dependent. However, these interferences, caused by temperature changes, also follow the principles as presented in FIG. 1. If several interferences add up, it is preferred to calibrate the signals of the rectangular coils A, B, on the primary side, to eliminate the dependency on distance, while an additional reference coil can then be provided, in the known manner, to eliminate the dependency on temperature.

Figure 2:
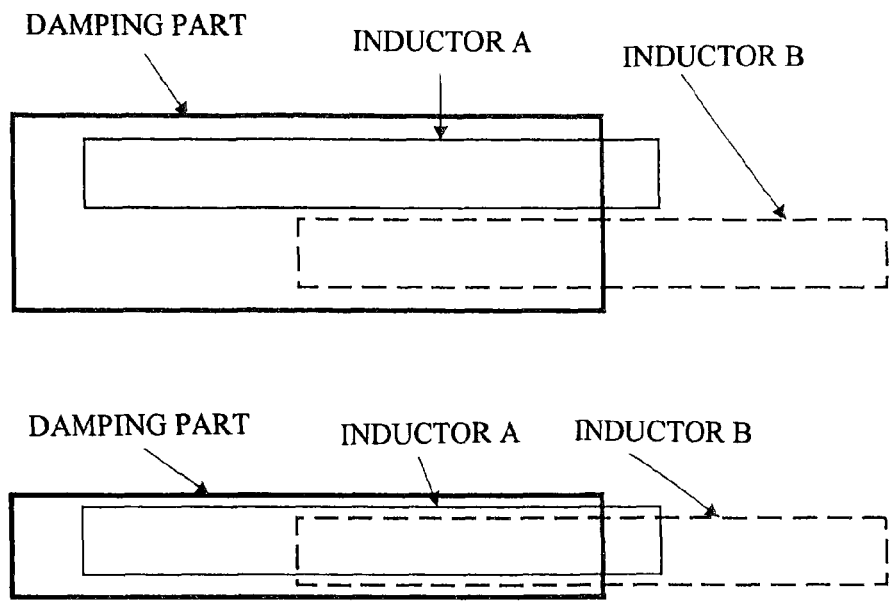
FIG. 2 is for clarification of the linear configuration, two partial views of FIG. 1, one for overlapping of the linear coils A, B positioned next to each other, and one for the overlapping of the linear coils A, B positioned under each other.
Figure 4:
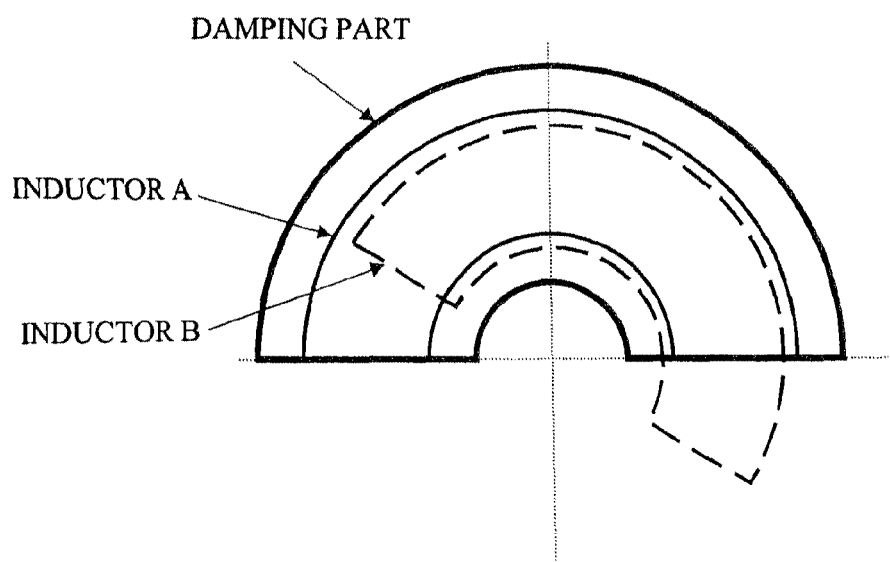
FIG. 4 is a bent configuration of the rectangular coils A, B and a damping part, for the purpose of angle measurement, as compared to the linear configurations in FIG. 2.
Figure 5:
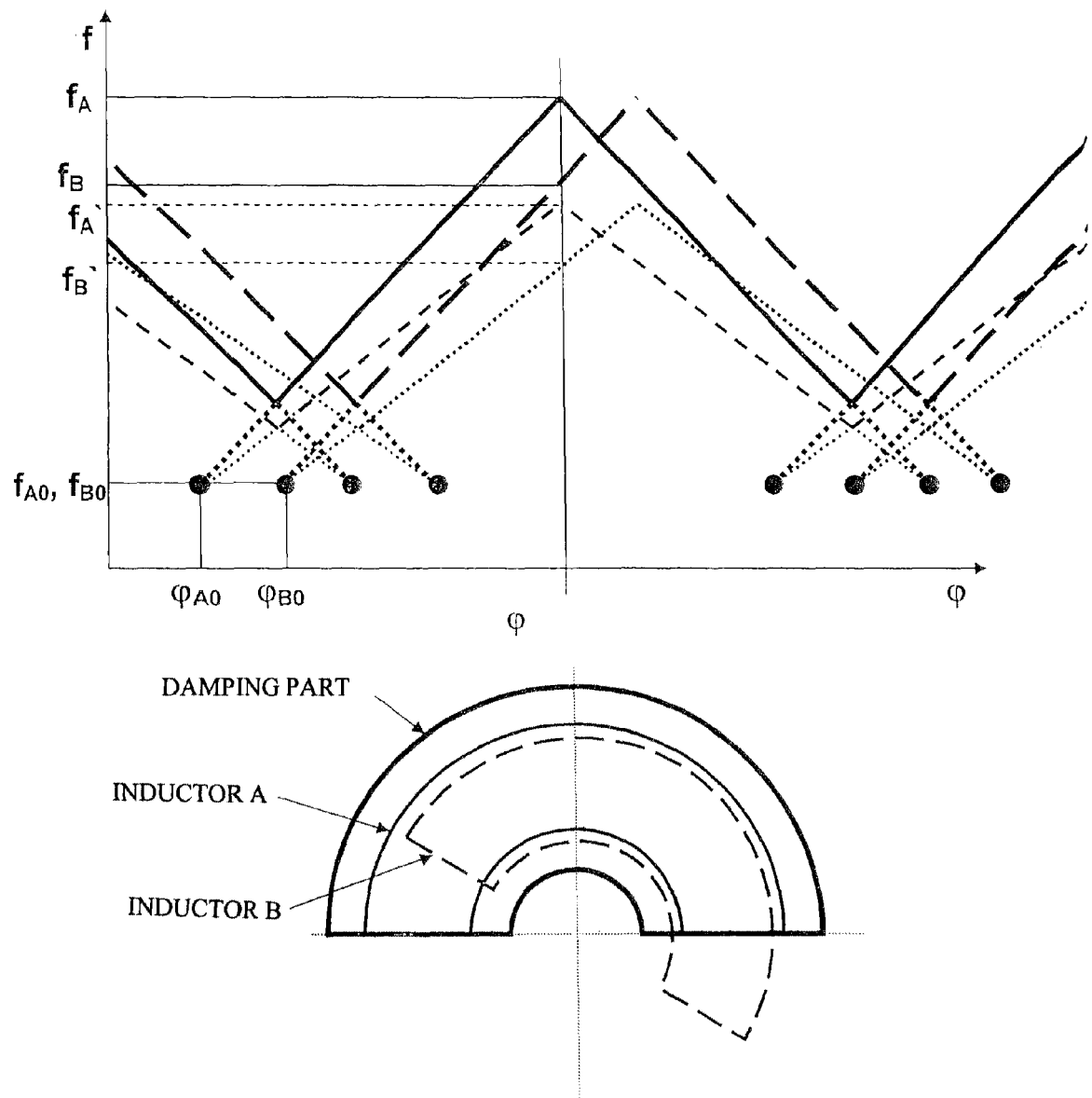
FIG. 5 is the bent configuration of FIG. 4 with the related array of characteristic curves.

In a further embodiment, all the previous considerations apply for an arch shape configuration, as presented in the bottom FIG. 4, in comparison to the linear configuration in FIG. 2. In this arch shape configuration, angle α can be measured in the same manner as previously described for the position s. FIG. 5 shows the associated characteristic curve arrays. The configuration, as in FIGS. 4 and 5, due to the high resolution of the characteristic curve is mainly suitable as an angle sensor but can also be used, in lower resolution, for recognition of the rotation speed.

In FIG. 4, the measuring range M covers almost 180° because the two half-circle coils overlap in a range of almost 180°. The damping part also covers almost 180°. It could be also longer, when considering a measuring range of less than 180°; but the half-circle configured damping part is especially advantageous for the reason presented in the following.

The inventive principle also applies to the angle sensor as shown in FIGS. 4 and 5, in which just the edge of the damping part always participates in partial coverage of the coils. Each of the two coil areas increasingly covers up to a value of 85% of the length of the coil, for example, which is decisive for the linearity overlapping range. In addition, the remaining 15% in the overhang area of the coil can be covered. The other edge of the elongated damping part is, in principle, not a part of this definition.

However, a mirror image measuring process can take place when, in accordance with FIG. 5, the front edge passes above the entire pair of coils and, therefore, is eliminated from the definition of the covered coil areas. In this case, either the end of the measuring range has been reached (if the damping part is undefined longer than the pair of coils) or, a mirror image measuring range is attached (in accordance with FIG. 5, in case the damping part is almost as long as one of the coils). In the example of the embodiment as shown in FIGS. 4 and 5, the effect doubles the measuring range from 180° to 360°.

The same as in FIG. 5 (doubling of the angle measurement) could, by the way, also be used for doubling the straight line measuring range M, particularly in measuring applications in which the length of the damping part, relative to the pair of coils, would be sufficiently defined. In that case, it would be possible to mirror image repeat, in FIG. 1, the measuring effect of the front edge, by means of the rear edge.

Figure 6:
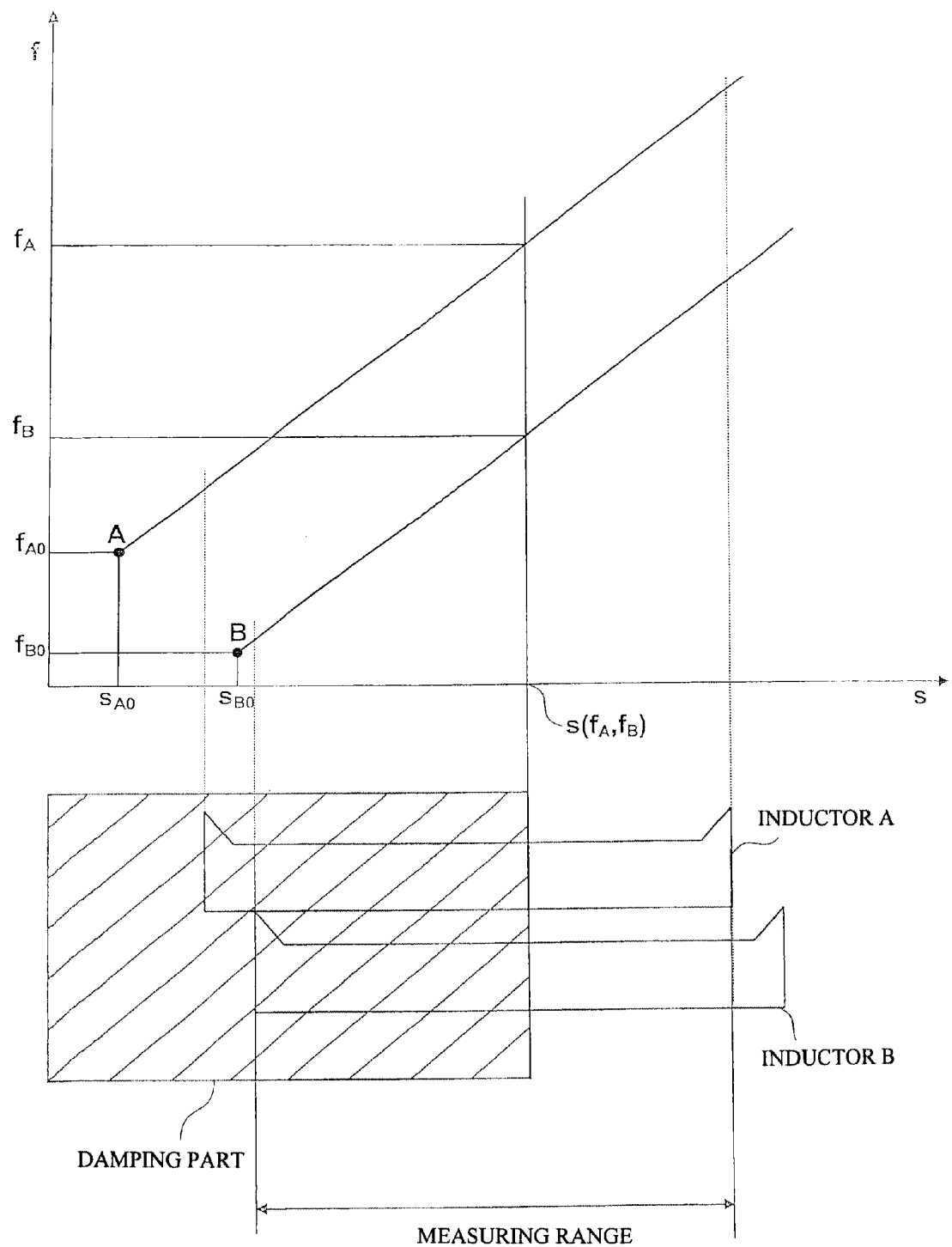
FIG. 6 are two measurement coils A and B, two associated characteristic curves, and a damping part, similar to FIG. 1, but the rectangular coils are trapezoidal extended for the purpose of additional linearity of the measuring range.
Figure 7:
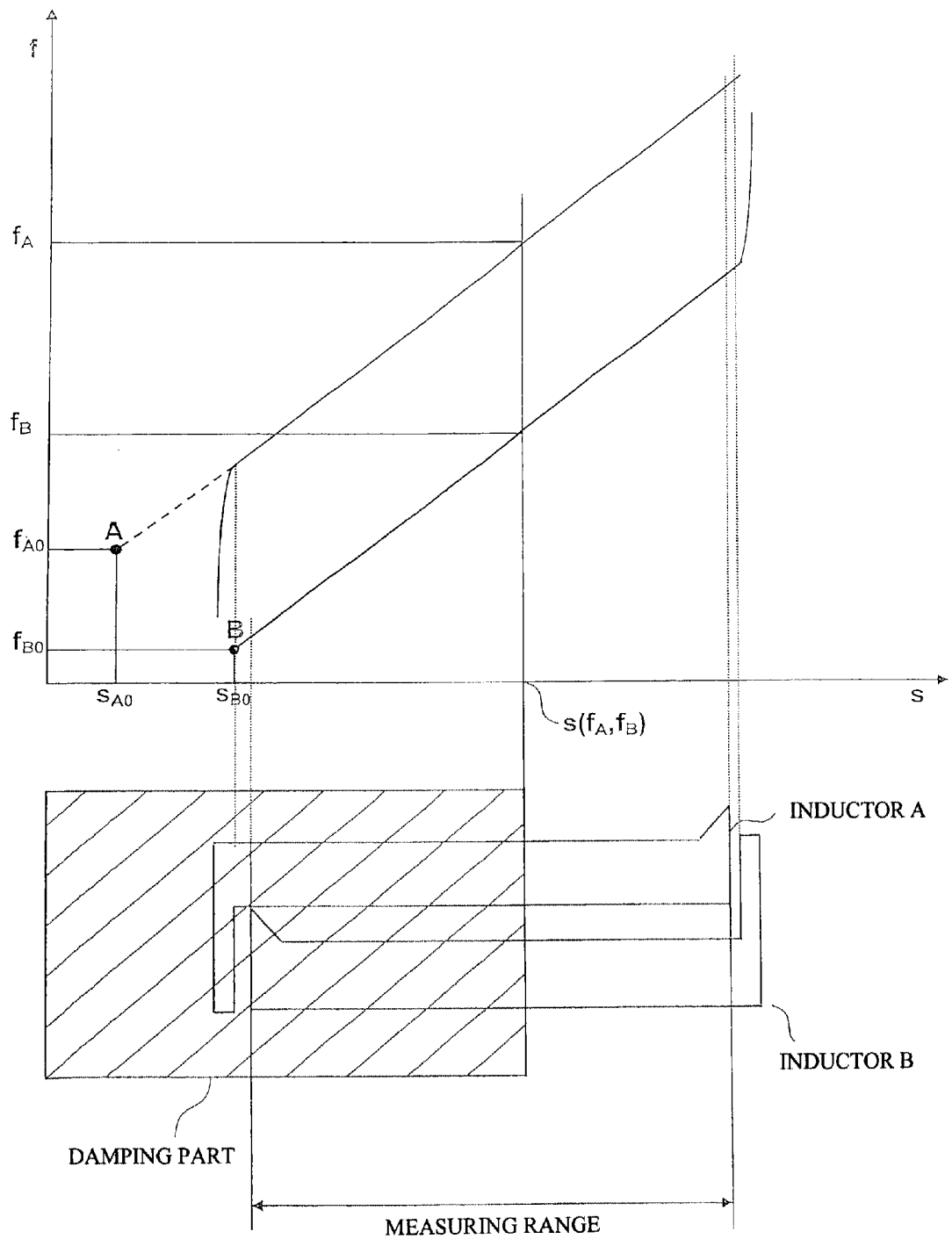
FIG. 7 are two measuring coils A and B, two associated characteristic curves, and a damping part, similar to FIG. 1 and FIG. 6, but the pair of coils A, B are trapezoidal extended at one end, and hook-shape are extended at the other end for the purpose of further linearity of the characteristic curves.

FIG. 6 and FIG. 7 show variation of how to exclude edge effects of the rectangular flat coils. Trapezoidal extensions of the coil ends, in accordance with FIG. 6, are the preferred means to keep the characteristic curve f(s) also linear towards the edge of the measuring range. The trapezoidal extension can be one sided towards the direction of the measurement, as shown in FIG. 6, or it can also be in a trumpet shape, distributed on both sides of the measuring axis s.

Another embodiment is shown in FIG. 7 where one end of the rectangular coil A is designed in a hook shape, reaching over the trapezoidal shape of the end of coil B. Accordingly, the other end of coil A is designed in a trapezoidal shape and the associated end of coil B in a hook shape. This configuration is especially space saving and linear.

Figure 8:
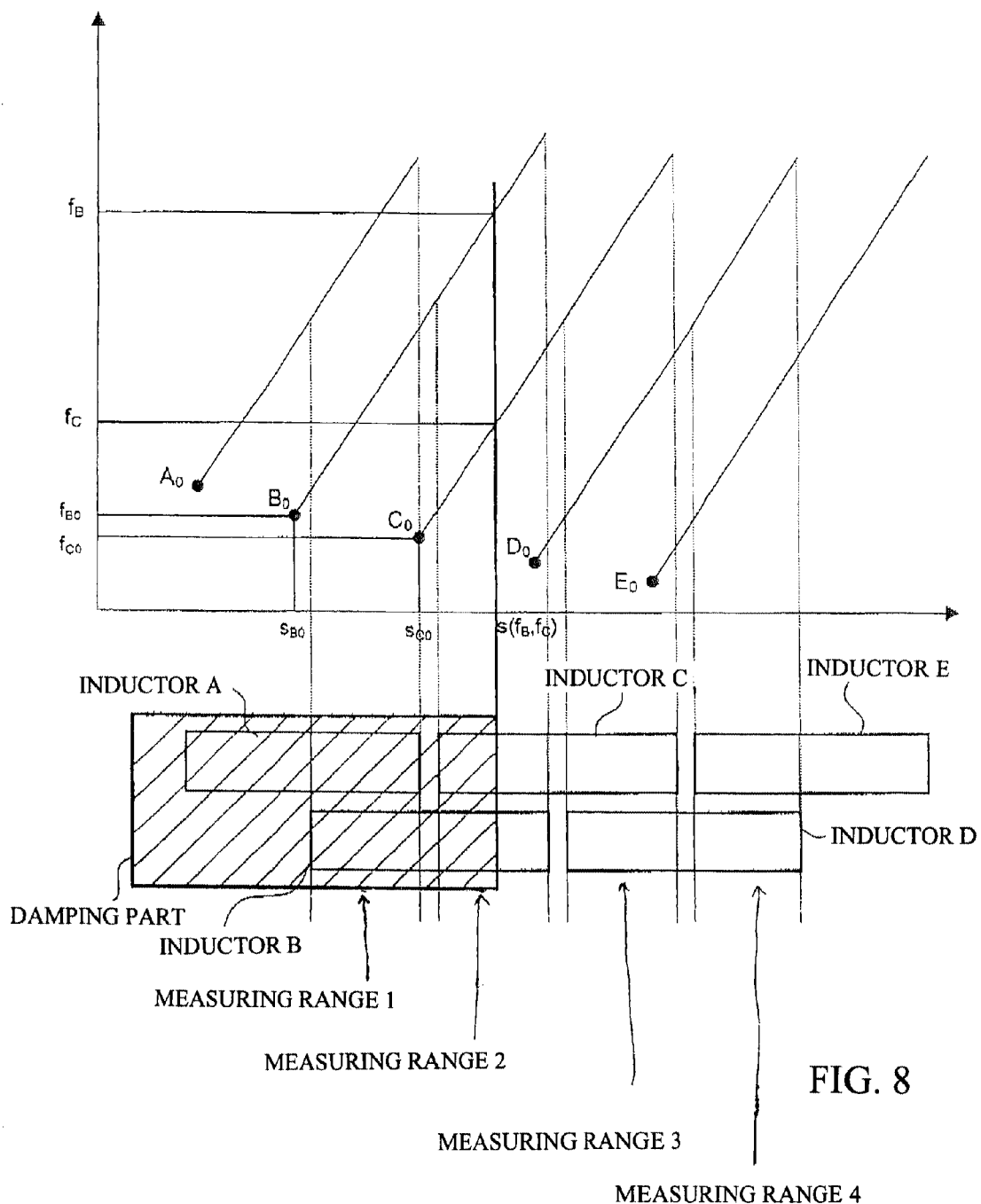
FIG. 8 is a configuration of several inductor coils, in a series configuration with several overlapping measuring ranges, for extending the linear measuring range.

Finally, FIG. 8 shows a variation of the linear configuration in accordance with FIG. 1 in which coil A not only overlaps with coil B, but an additional coil C overlaps with coil B. Hereby, a second measurement range 2 is created in addition to the measuring range 1. An overlap of the coil C with an additional coil D, creates a measuring range 3, an overlap of the coil D with an additional coil E creates a measuring range 4, and so forth. Hereby, the serial configuration of pairs of coils, in accordance with FIG. 1, enables an extension of the measuring range. The overlap, in this particular case, cannot exceed 50% of a coil length L.

FIG. 8 shows the associated five characteristic curves (with the five virtual points of rotation outside of the related measuring range).

The invention claimed is:

1. A configuration of a pair of inductor coils (A, B) in a local measuring range (M) and in a nominal distance of an eddy current damping part,
   a) whereby the pair of inductor coils (A, B), as rectangular coils (A, B), overlap within the measuring range (M) and the overlapping range forms the measuring range (M),
   b) whereby the pair of inductor coils (A, B) have an overhang of the coil length (L), in each case at one end of the measuring range (M),
   c) whereby the eddy current damping part, relative to the pair of coils (A, B), is shifting and the eddy current damping part at least partially covers both of the pair of coils (A, B),
   d) and the pair of inductor coils (A, B), with a measuring oscillator, each having a linear characteristic curve of the oscillator frequency (f) as a function of the location (position s or angle α), and
   e) these linear characteristic curves each have, largely independent from interferences, meaning a variation of the nominal distance, from tilting in the direction of measurement, and changes of the temperature, having a virtual, meaning outside of the measuring range (M), point of rotation ($A_0$, $B_0$) within the characteristic curves.

2. The inductor coil according to claim 1, further comprising that the rectangular coils (A, B), for the purpose of measuring of a position (s), is straight line.

3. The inductor coil configuration according to claim 1, further comprising that the rectangular coils (A, B), for the purpose of measuring an angle (α) or a rotation speed, are bent.

4. The inductor coil configuration according to claim 3, further comprising that the bent rectangular coils (A, B), for the purpose of measuring a half circle, overlap in a measurement range (M) of almost 180 degrees.

5. The inductor coil configuration according to claim 4, further comprising that the bent rectangular coils (A, B), for the purpose of measuring a half circle, overlap in the measuring range (M) by almost 180 degrees.

6. The inductor coil configuration according to claim 5, further comprising that, for measuring of a first half circle an increasing coverage of the measuring range (M) is utilized through the damping part, and, for measuring the second half circle, a decreasing coverage of the measuring range (M) is used by the damping part, so that a full circle (M=360 degrees) is measurable.

7. The inductor coil configuration according to claim 6, further comprising that the rectangular coils (A, B), for the purpose of extending the linear measuring range (M), have a trapezoidal extension at least at one end.

8. The inductor coil configuration according to claim 7, further comprising that the rectangular coils (A, B) have a trapezoidal expansion, one sided, in the direction of measurement.

9. The inductor coil configuration according to claim 7, further comprising that the rectangular coils (A, B) are expanded at a first end as a trapezoidal shape and at a second opposite end as a hook shape.

10. The inductor coil configuration according to claim 9, further comprising that the overlapping, which defines the measuring range (M), occurs by having the rectangular coils (A, B) positioned next to each other, in one measuring plane, and the damping part has an adequate width.

11. The inductor coil configuration according to claim 9, further comprising that the overlapping, which defines the measuring range (M), occurs by having the rectangular coils (A, B) positioned on both sides of the coil carrier, opposite to each other, for counteracting a tilting of the damping part, transversal to the direction of measuring.

12. The inductor coil configuration according to claim 11, further comprising that the rectangular coils (A, B) are calibrated, for eliminating a dependency on distance, for example perpendicular to the direction of measuring, and that an additional reference coil is provided for eliminating a temperature dependency.

13. The inductor coil configuration according to claim 11, further comprising that the measuring range (M) is spreading over several measuring ranges (1, 2, 3, 4), whereby several coils (A, B, C, D, E), positioned as one after the other, define several overlapping ranges, and one edge of the damping part defines the actual measuring range (for example 2) of the operative pair of coils (for example B, C).

14. The inductor coil configuration according to claim 13, further comprising that the signals (oscillator frequencies f) of each operative pair of coils (for example B, C) are analyzed as pairs.

* * * * *